3,671,277
ULTRAVIOLET RAY CUTTING PINK GLASS FOR COLOR PHOTOGRAPHY
Masao Ohno, Kawasaki-shi, and Katsumi Kijima, Tokyo, Japan, assignors to Nippon Kogaku K.K., Tokyo, Japan
Filed Oct. 1, 1969, Ser. No. 862,770
Claims priority, application Japan, Oct. 8, 1968, 43/72,887
Int. Cl. C03c 3/04, 3/30; F21v 9/00
U.S. Cl. 106—47 Q
5 Claims

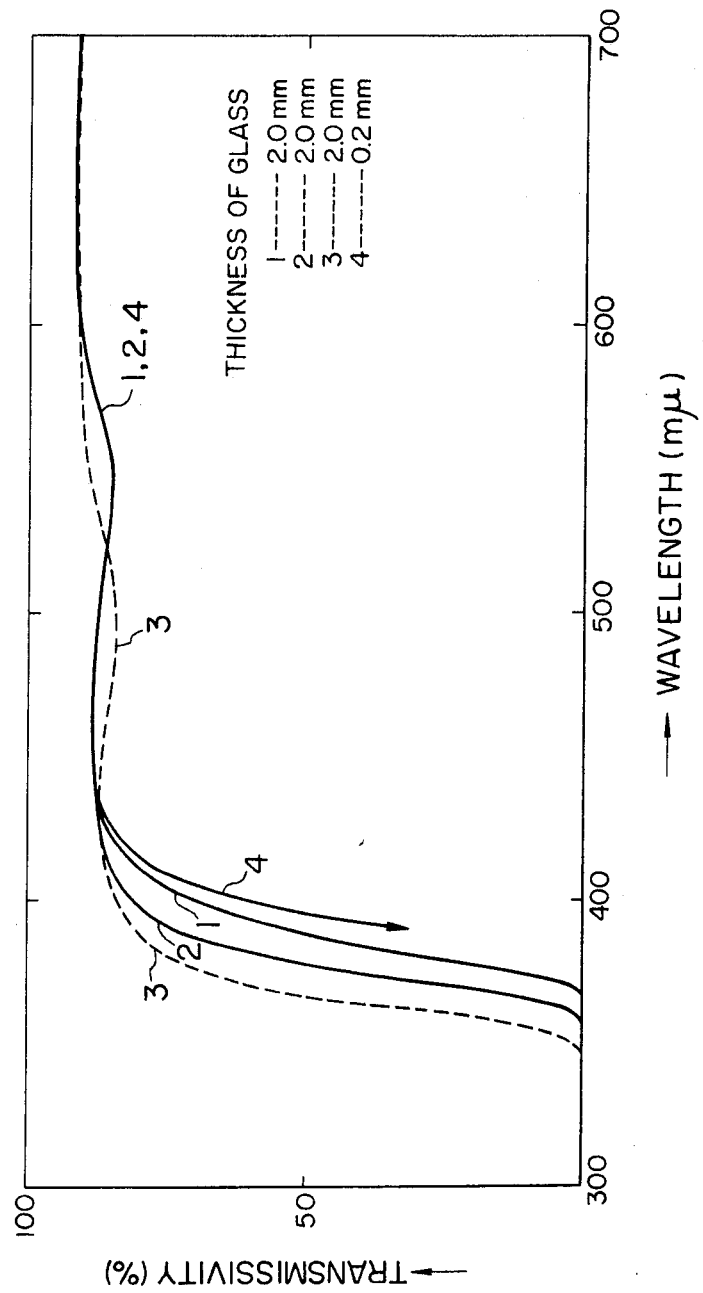

ABSTRACT OF THE DISCLOSURE

An ultraviolet ray cutting pink glass for color photography of this invention provides the absorption peak wavelength in the vicinity of 550 m$\mu$ while the ultraviolet ray cutting limit wavelength within the range from 380 m$\mu$ to 400 m$\mu$. It does not bring about the solarization. Glass material contains at least cerium oxide and gold and the material is melted at a temperature ranging from 1350° to 1500° C., cooled with the temperature gradient from 10° C./h. to 25° C./h., and reheated for 5 to 50 hrs. at a temperature in the vicinity of the softening point of glass for coloring the same.

---

The present invention relates to an ultraviolet ray cutting pink glass for color photography and a method for making thereof.

As an ultraviolet cutting filter for general color photography, it is preferable to use a pink glass filter having the ultraviolet absorption wavelength limit within the range from 380 m$\mu$ to 400 m$\mu$ and the absorption peak of a few percent in the range from 530 to 560 m$\mu$.

In the conventional pink glass for color photography, selenium has been used as coloring agent so that the absorption peak wavelength is in the vicinity of 500 m$\mu$ and the ultraviolet absorption wavelength limit, in the vicinity of 360 m$\mu$. Therefore, the spectral characteristic of such conventional pink glass will not show the sufficient fidelity in reproducing the natural color from the standpoint of the spectral transmission characteristic of the photo lens as well as the color sensitivity of the color film. Furthermore, the color of selenium in glass is easily influenced by the delicate changes of the melting atmosphere and other various conditions for melting glass. The gelatin filters are marketed as the pink filter for cutting ultraviolet rays in color photography. The absorption peak wavelength of this filter is 550 m$\mu$ while the ultraviolet cutting limit is 400 m$\mu$ so that the spectral characteristic of this filter is satisfactory, but this filter has the disadvantages of the spectral characteristic variation due to the decomposition of the organic coloring agent in the gelatin by the incident light and of the poor thermal and mechanical durability of the gelatin base.

In view of the above, the primary object of the present invention is to eliminate such defects or disadvantages of the conventional pink glass and to provide an ultraviolet ray cutting pink glass for color photography showing the high fidelity in reproduction of the natural color from the standpoint of the spectral transmission characteristic of the photo lens and the color or spectral sensitivity of the color film. That is, the present invention provides an ultraviolet cutting pink glass for color photography in which the absorption peak wavelength is in the vicinity of 550 m$\mu$ while the ultraviolet ray cutting limit wavelength, within the range from 380 m$\mu$ to 400 m$\mu$ and which will not bring about the solarization.

Thus, the pink glass according to the present invention is best suited for color photography.

According to the present invention, the above object may be accomplished by an improved method for making a pink glass characterized by comprising melting the glass material containing at least cerium oxide and gold at a temperature ranging from 1,350° C. to 1,500° C., cooling the glass with the temperature gradient ranging from 10° C./h. to 25° C./h., and subjecting the glass to the reheat-treatment for 5 to 50 hours at a temperature in the vicinity of the softening point of the glass, thereby coloring the same. Thus, the ultraviolet ray cutting pink glass for color photography, in which the ultraviolet ray absorption wavelength limit is within the range of from 380 m$\mu$ to 400 m$\mu$ and the absorption center peak is within the range of from 530 m$\mu$ to 560 m$\mu$, may be provided. The composition of the glass material may be:

| | Percent by weight |
|---|---|
| $SiO_2$ | 43–73 |
| $B_2O_3$ | 0–6 |
| $Al_2O_3$ | 0–3 |
| $R_2O$ | [1] 5–20 |
| $RO$ | [2] 0–5 |
| $PbO$ | 20–37 |
| $Sb_2O_3$ and/or $Bi_2O_3$ | 0–1 |
| $SnO$ and/or $SnO_2$ | 0.1–1 |
| $CeO_2$ | 0.5–5 |
| $Au$ | 0.005–0.05 |

[1] R = alkali metal.
[2] R = divalence metal except Pb.

In molten glass batch, carbonates, hydroxides, hydrates etc. may be used as the above described oxides. For example, less than 5% of $RNO_3$ as $R_2O$ may be used.

Pink color due to gold in glass having the absorption peak wavelength in the vicinity of 550 m$\mu$ may be determined by the basic composition of glass, the weight percent of gold to be added, types and kinds of thermal reducing agents and their amount to be added, the gradual cooling or annealing condition of molten glass, the reheating condition for coloring, etc.

When the gold ingredient is in excess of a certain range, the glass becomes dark red violet or dark blue violet while when the gold ingredient is less than the certain range, the glass is colorless or light orange. The coloring process will be accelerated by adding "metallopholic agent" and the thermal reducing agent such as cerium oxide, tin oxide, bismuth oxide, antimony oxide, etc. when the gold ingredient is suitable so that the pink glass having the absorption peak wavelength in the vicinity of 550 m$\mu$ may be obtained.

According to the present invention, a relatively large quantity of cerium oxide is added so that coloring by gold ingredient may be facilitated and at the same time the desired ultraviolet ray cutting characteristic may be attained. Furthermore, cerium oxide alone or together with antimony oxide and/or alkali nitrate facilitates degassing of molten glass so that the high grade filter glass may be obtained.

In making the well balanced or stabilized pink glass, following relation between the amount of gold to be added and the annealing condition is observed. That is when the amount of gold to be added is reduced as much as possible while the annealing velocity is adjusted at a relatively lower speed, coloring of pink of glass is less influenced by the re-heating conditions so that the stabilized color may be attained. Re-heating condition for coloring is the heat-treatment for 5 to 50 hours at a temperature in the vicinity of a softening point of the glass having the above described composition.

The above described composition will be explained in more detail hereinafter. When the $SiO_2$ content is less than 43% by weight as described above, the chemical durability is poor while when the content is in excess of 73% by weight, the melting characteristic is adversely affected.

$B_2O_3$ is added for improving the chemical durability, but when it is added in excess of the above described range, that is 6% by weight, there is a fear that it gives color while the glass is melted and annealed so that the final color of the glass is adversely affected.

$Al_2O_3$ is added also for improving the chemical durability of the glass, but the amount in excess of the above described range, that is 3% by weight will adversely affect pink-coloring as in the case of the excess $B_2O_3$.

$R_2O$ representing oxides of alkali metals may be used singly or in combination for improving the melting property of the glass. If the content is less than the above described range, no significant result will be brought about. On the other hand, the amount in excess of the range described above, the chemical durability will be impaired.

RO representing one or combination of oxides of bivalent metals except PbO is added and also influences coloring so that the content must be so selected depending upon coloring conditions. The content in excess of the above described range, 0 to 5% by weight, tends to cause the corrosion of the refractory material and devitrification.

PbO is added so that by a suitable combination with $CeO_2$ the glass is imparted with the ultraviolet ray cutting property. No significant result will be attained if the content is less than the described range, 0.5 to 5% by weight, and if the content is in excess of 5% by weight, the chemical durability is deteriorated.

SnO and/or $SnO_2$ serves as a thermal reducing agent for gold coloring and the single use or the combinations thereof serves to cause suitable coloring of the glass.

$Sb_2O_3$ and/or $Bi_2O_3$ in combination with nitrates serve to degas, but the content in excess of the above described range, 0 to 1% by weight, will adversely affect the gold coloring.

$CeO_2$ in combination with PbO will serve the above described purpose and facilitate degassing. If the content is less than the above described range from 0.5 to 5% by weight, no significant result will be attained. On the other hand, the excess content causes the ultraviolet ray cutting wavelength limit to extend into the visible spectrum, and remarkably agitates the gassing or foaming of the molten glass, thereby degrading the melting property.

Au is added for providing the light absorption wavelength range from 530 m$\mu$ to 560 m$\mu$. The less content will cause the less absorption, while the excess content the excess absorption.

Next the examples of the present invention will be described. The glass ingredients are as follows:

|  | (1) weight ratio | (2), weight ratio |
|---|---|---|
| $SiO_2$ | 52.5 | 54.1 |
| $B_2O_3$ | 0.5 |  |
| $Al_2O_3$ | 0.5 |  |
| $Na_2O$ | 0.5 | 4.1 |
| $K_2O$ | 13.0 | 8.3 |
| CaO | 0.5 |  |
| PbO | 32.0 | 32.5 |
| $Sb_2O_3$ | 0.5 | 1.0 |
| SnO |  | 0.4 |
| $SnO_2$ | 0.5 |  |
| $CeO_2$ | 4.0 | 2.0 |
| Au | 0.01 | 0.0085 |

The glass materials each having the above described composition was melted at a temperature from 1,350° C. to 1,500° C. and slowly cooled or annealed at a temperature gradient from 10° C./h. to 25° C./h. to room temperature. Thereafter, the glass was reheated at a temperature from 530° C. to 550° C. for 10 to 50 hours, thereby coloring the glass.

The spectral transmission characteristics of thus obtained pink glasses for color photography are shown in the attached figure. The curves 1 and 2 correspond to the above described Examples 1 and 2, respectively, and it will be readily seen that they have desired spectral transmission characteristics. The curve 3 shows the characteristic of one pink glass for color photography obtained in the market in which the glass is colored by selenium. The curve 4 shows the characteristic of one ultraviolet ray cutting pink gelatin filter for color photography obtained in the market.

From the foregoing, it will be readily understood that the glass obtained by adding gold, cerium oxide, tin oxide, etc. each in a predetermined amount upon melting of $SiO_2$-$R_2O$-PbO glass, where R repersents an alkali metal, is re-heated for coloring at a temperature in the vicinity of the softening point of the glass so that the ultraviolet ray cutting pink glass having the above described characteristics may be obtained.

What is claimed is:

1. An ultraviolet ray cutting optical pink glass for color photography having the ultraviolet ray absorption wavelength limit within the range of from 380 m$\mu$ to 400 m$\mu$ and the absorption center peak within the range of from 530 m$\mu$ to 560 m$\mu$, consisting of the following composition:

|  | Percent by wt. |
|---|---|
| $SiO_2$ | 43–73 |
| $B_2O_3$ | 0–6 |
| $Al_2O_3$ | 0–3 |
| $R_2O$ | 5–20 |
| CaO | 0–5 |
| PbO | 20–37 |
| $Sb_2O_3$ and/or $Bi_2O_3$ | 0–1 |
| SnO and/or $SnO_2$ | 0.1–1 |
| $CeO_2$ | 0.5–5 |
| Au | 0.005–0.05 | wherein R is an alkali metal selected from the group consisting of Na, K and mixtures thereof.

2. An ultraviolet ray cutting optical pink glass for color photography having the ultraviolet ray absorption wavelength limit within the range of from 380 m$\mu$ to 400 m$\mu$ and absorption center peak within the range of from 530 m$\mu$ to 560 m$\mu$, consisting essentially of the following composition in weight ratio:

| $SiO_2$ | 52.5 |
|---|---|
| $B_2O_3$ | 0.5 |
| $Al_2O_3$ | 0.5 |
| $R_2O$ | 13.5 |
| CaO | 0.5 |
| PbO | 32.0 |
| $Sb_2O_3$ | 0.5 |
| $SnO_2$ | 0.5 |
| $CeO_2$ | 4.0 |
| Au | 0.01 | wherein $R_2$ is alkali metal selected from the group consisting of Na, K and mixtures thereof.

3. An ultraviolet ray cutting optical pink glass according to claim 2, wherein $R_2O$ consists of $Na_2O$ of 0.5 weight ratio and $K_2O$ of 13.0 weight ratio.

4. An ultraviolet ray cutting optical pink glass for color photography having the ultraviolet ray absorption wavelength limit within the range of from 380 m$\mu$ to 400 m$\mu$ and absorption center peak within the range of from 530 m$\mu$ to 560 m$\mu$, consisting essentially of the following composition in weight ratio:

| $SiO_2$ | 54.1 |
|---|---|
| $R_2O$ | 12.4 |
| PbO | 32.5 |
| $Sb_2O_3$ | 1.0 |
| SnO | 0.4 |
| $CeO_2$ | 2.0 |
| Au | 0.0085 | wherein $R_2$ is alkali metal selected from the group consisting of Na, K and mixtures thereof.

5. An ultraviolet ray cutting pink glass according to claim 4, wherein $R_2O$ consists of $Na_2O$ of 4.1 weight ratio and $K_2O$ of 8.3 weight ratio.

References Cited

UNITED STATES PATENTS

| | | | |
|---|---|---|---|
| 1,271,652 | 7/1918 | Bellamy | 106—53 |
| 2,515,275 | 7/1950 | Stookey | 106—53 |

FOREIGN PATENTS

| | | | |
|---|---|---|---|
| 672,749 | 5/1952 | Great Britain | 106—49 |

TOBIAS E. LEVOW, Primary Examiner

M. L. BELL, Assistant Examiner

U.S. Cl. X.R.

106—53; 252—300